(12) United States Patent
Hokenmaier et al.

(10) Patent No.: US 10,489,990 B2
(45) Date of Patent: Nov. 26, 2019

(54) VEHICLE DIAGNOSTIC DEVICE AND DATA TRANSMISSION DEVICE

(71) Applicant: Robert Bosch GmbH, Stuttgart (DE)

(72) Inventors: Fabian Hokenmaier, Waeschenbeuren (DE); Stefan Doehren, Remshalden-Grunbach (DE); Marco Le Brun, Florence (IT)

(73) Assignee: Robert Bosch GmbH, Stuttgart (DE)

( * ) Notice: Subject to any disclaimer, the term of this patent is extended or adjusted under 35 U.S.C. 154(b) by 320 days.

(21) Appl. No.: 15/314,338

(22) PCT Filed: Apr. 14, 2015

(86) PCT No.: PCT/EP2015/058033
§ 371 (c)(1),
(2) Date: Nov. 28, 2016

(87) PCT Pub. No.: WO2015/180885
PCT Pub. Date: Dec. 3, 2015

(65) Prior Publication Data
US 2017/0200327 A1 Jul. 13, 2017

(30) Foreign Application Priority Data
May 28, 2014 (DE) .................. 10 2014 210 238

(51) Int. Cl.
*G07C 5/00* (2006.01)
*G07C 5/08* (2006.01)
*H04L 29/08* (2006.01)

(52) U.S. Cl.
CPC ........... *G07C 5/008* (2013.01); *G07C 5/0808* (2013.01); *G07C 2205/02* (2013.01); *H04L 67/12* (2013.01)

(58) Field of Classification Search
None
See application file for complete search history.

(56) References Cited

U.S. PATENT DOCUMENTS 6,181,992 B1 * 1/2001 Gurne ................... B60T 8/885
701/31.4
6,407,554 B1 * 6/2002 Godau ................ G01R 31/006
324/503

(Continued)

FOREIGN PATENT DOCUMENTS

DE         4011560 A1   10/1991
EP        2 259 230 A1  12/2010
EP        2 605 230 A1   6/2013

OTHER PUBLICATIONS

International Search Report for PCT/EP2015/058033, dated Jul. 9, 2015.

*Primary Examiner* — Jonathan M Dager
(74) *Attorney, Agent, or Firm* — Norton Rose Fulbright US LLP; Gerard Messina

(57) ABSTRACT

A vehicle diagnostic device is described for determining the condition of at least one component of a motor vehicle includes an interface device, which may be coupleable to a diagnostic interface of the motor vehicle, a first data transmission device, which is coupled to the interface device, a second data transmission device, which is coupled to the interface device, the first and second data transmission devices being identical circuits, and a data processing device, which is coupled to the first and second data transmission devices, the data processing device being configured to carry out a plurality of diagnostic protocols and additionally being configured to carry out different diagnostic protocols via the first and second data transmission devices.

9 Claims, 1 Drawing Sheet

(56) References Cited

U.S. PATENT DOCUMENTS

| | | | |
|---|---|---|---|
| 6,603,394 B2 * | 8/2003 | Raichle | G08G 1/20 340/438 |
| 6,662,087 B1 * | 12/2003 | Liebl | G07C 5/008 701/31.4 |
| 6,718,425 B1 * | 4/2004 | Pajakowski | G01M 17/00 710/303 |
| 6,772,248 B1 * | 8/2004 | McClure | G05B 19/042 701/24 |
| 6,816,760 B1 * | 11/2004 | Namaky | G06F 11/2733 701/33.2 |
| 8,626,375 B2 * | 1/2014 | Miller | B60R 16/02 361/827 |
| 8,688,313 B2 * | 4/2014 | Margol | G06F 8/61 701/31.4 |
| 8,700,254 B2 * | 4/2014 | Basir | G07C 5/008 701/31.4 |
| 8,948,923 B2 * | 2/2015 | Scheider | H04L 12/66 370/241 |
| 10,024,923 B2 * | 7/2018 | Eitel | G01R 31/3644 |
| 10,152,836 B2 * | 12/2018 | Rozint | G06Q 10/20 |
| 2002/0110146 A1 * | 8/2002 | Thayer | G07C 5/008 370/465 |
| 2004/0111188 A1 * | 6/2004 | McClure | B60W 50/04 701/1 |
| 2005/0251604 A1 * | 11/2005 | Gerig | H04L 12/4625 710/120 |
| 2006/0041348 A1 * | 2/2006 | Liebl | G07C 5/008 701/31.5 |
| 2006/0217855 A1 * | 9/2006 | Chinnadurai | G07C 5/008 701/32.7 |
| 2008/0071439 A1 * | 3/2008 | Bertosa | G07C 5/008 701/32.7 |
| 2009/0292414 A1 * | 11/2009 | Raichle | G07C 5/008 701/31.4 |
| 2010/0121986 A1 * | 5/2010 | Blanton | H04W 4/18 709/250 |
| 2012/0245786 A1 * | 9/2012 | Fedorchuk | H04L 67/12 701/29.1 |
| 2017/0084088 A1 * | 3/2017 | Reichardt | G07C 5/008 |

\* cited by examiner

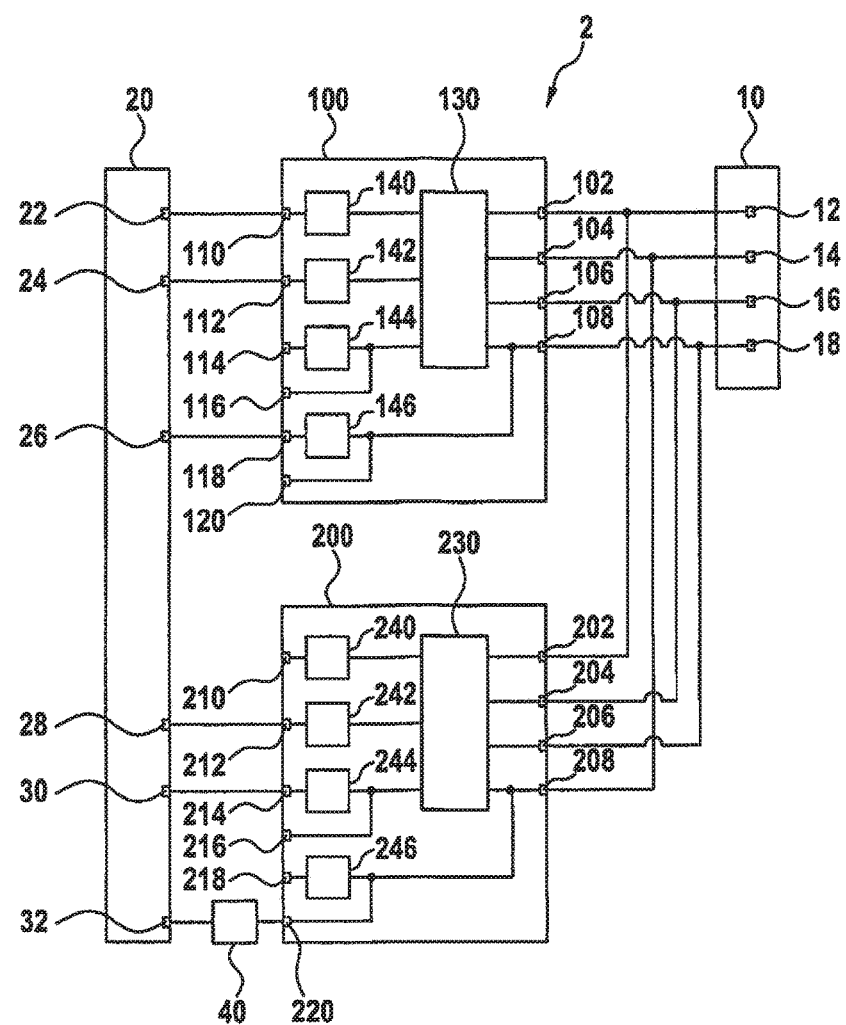

VEHICLE DIAGNOSTIC DEVICE AND DATA TRANSMISSION DEVICE

FIELD OF THE INVENTION

The present invention relates to a vehicle diagnostic device for determining the condition of at least one component of a motor vehicle and a method for operating a vehicle diagnostic device and a method for manufacturing a vehicle diagnostic device.

BACKGROUND INFORMATION

Vehicle diagnostic devices have proven successful for determining the condition of motor vehicle components. Such vehicle diagnostic devices are connectable to vehicle interfaces and used for analyzing vehicle data, such as those stored in vehicle control units or vehicle display systems, for example. The vehicle diagnostic devices are used for fault analysis, for programming vehicle control units and also for routine maintenance tasks. In all cases, the condition of one or multiple vehicle components is/are determined, and this in turn provides information about components to be serviced or replaced.

There is a certain amount of standardization in the diagnostic interface of the motor vehicle ("vehicle communication interface," VCI), but there are a great many different diagnostic protocols. First, these differ from one manufacturer to the next. Second, the diagnostic protocols differ according to the type and number of monitored components. In addition, there are very different use scenarios for such vehicle diagnostic devices. In some applications, all that matters is to check the data absolutely necessary and safety-relevant for the functioning of the vehicle. The vehicle diagnostic devices used by roadside assistance services are one example of this. In other cases, the goal is the preferably comprehensive inspection of all vehicle functions. For example, it may be desired during routine maintenance on a vehicle in combination with a vehicle service to also check on non-safety-relevant functions, such as, for example, the functioning of an electric sunroof via a vehicle diagnostic device.

SUMMARY

One object of the present invention is to provide a system architecture for a vehicle diagnostic device, which allows the efficient coverage of a large number of use scenarios.

A vehicle diagnostic device according to the present invention for determining the condition of at least one component of a motor vehicle includes an interface device, which may be coupled to a diagnostic interface of the motor vehicle, a first data transmission device, which is coupled to the interface device, a second data transmission device, which is coupled to the interface device, the first and second data transmission devices being identical circuits, and a data processing device, which is coupled to the first and second data transmission devices, the data processing device being configured to carry out a plurality of diagnostic protocols and additionally configured to carry out different diagnostic protocols via the first and second data transmission devices.

An overall improved system is achieved by dividing the data flow from the motor vehicle to the data processing device between the first and second data transmission devices. The two data transmission devices may work in parallel, so that different diagnostic protocols may be carried out at the same time. In addition, it is not necessary to connect all terminals on the data processing end of the first and second data transmission devices to the data processing device since only the terminals on the data processing end relevant for the respective diagnostic protocols to be carried out are to be taken into account. In this way, each of the data transmission devices has a smaller number of connected terminals on the data processing end, which facilitates integration of the components. Furthermore, the restriction to a selection of diagnostic protocols limits the power loss of each of the first and second data transmission devices, which in turn facilitates their design and integration. Even in the event of failure of one of the two data transmission devices, it is possible to carry out at least a reduced number of diagnostic protocols. Providing two or more data transmission devices increases the flexibility in many regards in implementing the diagnostic protocols in the vehicle diagnostic device. Bottlenecks in the transmission of data or signals between the vehicle interface and the data processing device may be reduced or prevented.

Furthermore, the division into two or more data transmission devices permits increased flexibility and optimization with regard to additional technical parameters of the terminals such as, for example, the leakage currents, the electric strength, the input impedance and/or the symmetry with regard to capacitance distribution. Coupling between the interface device and the data transmission devices and/or the coupling between the data transmission devices and the data processing device is optimizable in this way. This may in turn result in an increased overall data transmission rate between the data processing device and the vehicle and/or improve the signal quality. The possibilities for measuring analog signals from the vehicle may also be improved in this way.

The interface device may have a standardized interface such as, for example, a "diagnostic link connector" (DLC). The data processing device may be a microcontroller unit (MCU), i.e., a microcontroller-based data processing unit. However, it is also possible for the data processing device to be an FPGA, DSP, μC or ASIC. Examples of standard diagnostic protocols include OBD II, EOBC, CAN, J1708, SCI, "Hi voltage CAN" (ISO 11992), "flexible data rate CAN" (FDCAN), "diagnostic communication over Internet protocol" (DoIP), and "programming voltage generator" (Vpp).

Due to the use of two identical circuits for the first and second data transmission devices, integration into the vehicle diagnostic device is facilitated. Furthermore, production costs are minimized. The expression "identical circuits" does not require the circuits to be identical in all regards or to behave circuitry-wise in a completely identical manner. Instead, this expresses the fact that the circuits are based on the same design but may differ due to technical production-related tolerance ranges.

The term "vehicle diagnostic device" relates to a device, which may be coupled to a motor vehicle and with which the condition of at least one component of the motor vehicle may be determined. It is also possible for a vehicle control unit or a vehicle display system to be controllable or programmable with the aid of the vehicle diagnostic device. It is also possible for the communication between the vehicle and the vehicle diagnostic device to be bidirectional. The communication between the vehicle and the vehicle diagnostic device may take place in a question-answer format.

In one specific embodiment, the first and the second data processing devices are integrated circuits, in particular application specific integrated circuits (ASICs). In this way, the design of the data transmission devices may be adapted to the desired diagnostic protocols, and inexpensive mass production of the data transmission device module as an integrated circuit may be enabled.

In one specific embodiment, each one of the first and second data transmission devices has a plurality of diagnostic protocol driver circuits. Since the first and second data transmission devices are identical circuits, both have the same diagnostic protocol driver circuits. In this way, both data transmission devices are suitable for acquiring, optionally processing and forwarding the required data for the respective diagnostic protocols from the interface device. Due to the connection to the respective diagnostic protocol driver circuit, the data processing device may carry out the desired protocol via the desired data transmission device.

In one specific embodiment, the data processing device is coupled to a first subgroup of the diagnostic protocol driver circuits of the first data transmission device and is coupled to a second subgroup of the diagnostic protocol driver circuits of the second data transmission device, the first subgroup being different from the second subgroup. The coupling to different diagnostic protocol driver circuits is a simple and reliable possibility for implementing different diagnostic protocols via the first and second data transmission devices.

In one specific embodiment, each one of the first and second data transmission devices includes a plurality of terminals on the interface end and at least some of the respective diagnostic protocol driver circuits are coupled to the terminals on the interface end via at least one switching matrix. In this way, the diagnostic protocol driver circuits are able to access the input data from the vehicle, which are relevant for the respective diagnostic protocol.

In one specific embodiment, the interface device includes a plurality of interface terminals, the first data transmission device includes a plurality of terminals on the interface end, at least one first subgroup of which is coupled to the interface terminals, and the second data transmission device includes a plurality of terminals on the interface end, at least one second subgroup of which is coupled to the interface terminals, the coupling of the terminals of the first data transmission device on the interface end to the interface terminals of the interface device being different from the coupling of the terminals of the second data transmission device on the interface end to the interface terminals of the interface device. In this way, a preselection of the input signals relevant for the respective diagnostic protocols may be made. Not every data stream received by the vehicle is necessarily relevant for both data transmission devices because different diagnostic protocols are carried out via the two data transmission devices. Furthermore, the different coupling of the interface terminals of the interface device with the respective terminals of the two data transmission devices on the interface end may make it possible that different diagnostic protocols may be carried out using the same diagnostic protocol driver circuit. Different input data may result in the implementation of different diagnostic protocols. It is also possible to relieve the burden on the switching matrix components optionally provided in the data transmission devices because the signals received by the vehicle may be "presorted" due to the special coupling.

In one specific embodiment, the number of interface terminals is equal to the number of terminals of the first data transmission device on the interface end and equal to the number of terminals of the second data transmission device on the interface end, all terminals of the first and second data transmission devices on the interface end being coupled to the interface terminals. In this way, all data streams received by the vehicle are available in both data processing devices, thus allowing maximum flexibility for the diagnostic protocols.

However, it is also possible for the coupling between the terminals of the first data transmission device on the interface end to the interface terminals to be the same as the coupling of the terminals of the second data transmission device to the interface terminals on the interface end. Different data streams may be chosen as needed via switching matrix components or other connecting circuits.

In one specific embodiment, one or multiple external diagnostic protocol driver circuits is/are coupled between the data processing device and one or both of the first and second data transmission devices. In this way the first and second data transmission devices may be kept free of diagnostic protocol driver circuits which are particularly complex and/or are rarely used. This in turn increases the efficiency of the data transmission devices and reduces their complexity and power loss.

In one specific embodiment, the vehicle diagnostic device also has one additional data transmission device, the at least one additional data transmission device being a circuit identical to the first and second data transmission devices. In this way an additional division of the data flow and the signal processing may be made possible so that the aforementioned advantages in the architecture may be expanded with two data transmission devices. In particular, three, four, five or more identical data transmission devices may be present. Each of these data transmission devices may have an individual coupling to the interface terminals of the interface device.

It is possible that each of the data transmission devices forwards the signals or data received from the interface device to the data processing device without processing. However, it is also possible that the data transmission devices process the received signals or data. Possible types of processing include analog-to-digital conversions and/or filter operations and/or other types of signal processing (for example, time measurements, frequency analyses, etc.). Data may also be buffered in the data transmission devices.

Furthermore, it is possible that the vehicle diagnostic device is suitable not only for determining the condition of at least one component of a motor vehicle but it is additionally provided and suitable for programming a control unit situated in the vehicle, such as for programming an on-board computer of the vehicle, for example. In general, any type of communication with the vehicle may be carried out by the vehicle diagnostic device.

The present invention also includes a method for operating a vehicle diagnostic device, such as that described above in one of the specific embodiments, including the following steps: carrying out a first diagnostic protocol, whereby the communication between the data processing device and the interface device takes place via the first data transmission device, and carrying out a second diagnostic protocol, whereby the communication between the data processing device and the interface device takes place via the second data transmission device. The advantages mentioned above with respect to the vehicle diagnostic device are also achievable with the method for operating the vehicle diagnostic device. The modifications and specific embodiments discussed above are applicable accordingly to the method for operating the vehicle diagnostic device.

The present invention additionally includes a method for manufacturing a vehicle diagnostic device which includes the following steps: (a) providing a single type of data transmission device, (b) establishing a desired quantity of diagnostic protocols for the vehicle diagnostic device, (c) determining on the basis of the data transmission capacity and the possible terminal configurations of the provided type of data transmission device whether the desired quantity of diagnostic protocols may be carried out with a data transmission device of the provided type of data transmission device, and (d) based on the result of step (c), providing a vehicle diagnostic device with precisely one data transmission device of the provided type of data transmission device, which is situated for forwarding data between an interface device and a data processing device of the vehicle diagnostic device, or providing a vehicle diagnostic device including at least two data transmission devices of the provided type of data transmission device, which are situated for forwarding data between an interface device and a data processing device of the vehicle diagnostic device. In this way, vehicle diagnostic devices for applications, which are less comprehensive such as, for example, roadside assistance services, fleet management, police, insurance companies or other less complex additional services may be implemented easily with only one data transmission device. Since the same type of data transmission devices may be used for such applications and comprehensive applications using two data transmission devices, little or no changes need to be made in the additional components of the vehicle diagnostic device, and the cost of manufacturing the various types of vehicle diagnostic devices may be lowered.

The present invention additionally includes a data transmission device for a vehicle diagnostic device having a plurality of terminals on the interface end for coupling the data transmission device to an interface device of the vehicle diagnostic device, a plurality of terminals on the data processing end for coupling the data transmission device to a data processing device of the vehicle diagnostic device and a plurality of diagnostic protocol driver circuits, whereby the data transmission device is configured in such a way that it is able to carry out the communication between the data processing device and the interface device for a plurality of diagnostic protocols due to different couplings between the data transmission device and the interface device as well as between the data transmission device and the data processing device. Due to the fact that the data transmission device is able to carry out the communication for different diagnostic protocols, depending on the coupling with the interface device and the data processing device, the flexibility for the implementation of the vehicle diagnostic devices described above is provided with one, two or more data transmission devices. A large bandwidth of vehicle diagnostic devices having different applications may be provided with a single type of data transmission device in an efficient manner.

The present invention additionally includes a vehicle diagnostic device for determining the condition of at least one component of a motor vehicle including an interface device which is coupleable to a diagnostic interface of the motor vehicle, precisely one data transmission device such as that described in the preceding paragraph which is coupled to the interface device and a data processing device which is coupled to the data transmission device, whereby the coupling between the data transmission device and the interface device as well as that between the data transmission device and the data processing device is such that the data transmission device is able to carry out the communication between the data processing device and the interface device for a subgroup of the plurality of diagnostic protocols. Thus vehicle diagnostic devices for applications which are less comprehensive such as, for example, roadside assistance services, fleet management, police, insurance companies or other less complex additional services may be implemented easily with just one data transmission device.

BRIEF DESCRIPTION OF THE DRAWING

The FIGURE shows a block diagram of an exemplary specific embodiment of the vehicle diagnostic device according to the present invention.

DETAILED DESCRIPTION

FIG. 1 shows a block diagram of a vehicle diagnostic device 2 according to an exemplary specific embodiment of the present invention.

Vehicle diagnostic device 2 includes an interface device 10, a first data transmission device 100, a second data transmission device 200 and a data processing device 20. Interface device 10 is coupled to first data transmission device 100 and to second data transmission device 200. The two data transmission devices 100 and 200 are in turn coupled to data processing device 20. Details of these connections are described below.

First data transmission device 100 and second data transmission device 200 have an identical design. In other words, they contain the same circuit elements, which are interconnected in the same way. Only first data transmission device 100 is described in detail. To illustrate the identical design, the elements of first data transmission device 100 and of second data transmission device 200 are provided with corresponding reference numerals, the reference numerals of second data transmission device 200 being incremented by 100 in comparison with the reference numerals of first data transmission device 100.

First data transmission device 100 has four terminals on the interface end, namely a first terminal 102 on the interface end, a second terminal 104 on the interface end, a third terminal 106 on the interface end and a fourth terminal 108 on the interface end. In addition, the first data transmission device has six terminals on the data processing end, namely a first terminal 110 on the data processing end, a second terminal 112 on the data processing end, a third terminal 114 on the data processing end, a fourth terminal 116 on the data processing end, a fifth terminal 118 on the data processing end and a sixth terminal 120 on the data processing end. In addition, first data transmission device 100 includes a switching matrix 130 and four diagnostic protocol driver circuits, namely a first diagnostic protocol driver circuit 140, a second diagnostic protocol driver circuit 142, a third diagnostic protocol driver circuit 144 and a fourth diagnostic protocol driver circuit 146.

First terminal 102 on the interface end, second terminal 104 on the interface end and third terminal 106 on the interface end are connected to switching matrix 130. Fourth terminal 108 on the interface end is connected to switching matrix 130, to fourth diagnostic protocol driver circuit 146 and to sixth terminal 120 on the data processing end. Switching matrix 130 is connected to first diagnostic protocol driver circuit 140, to second diagnostic protocol driver circuit 142 and to third diagnostic protocol driver circuit 144 as well as to fourth terminal 116 on the data processing end. First diagnostic protocol driver circuit 140, second diagnostic protocol driver circuit 142 and third diagnostic protocol driver circuit 144 are connected to terminal 110 on the data processing end, to second terminal 112 on the data processing end and to third terminal 114 on the data processing end.

Fourth diagnostic protocol driver circuit 146 is connected to fifth terminal 118 on the data processing end.

First data transmission device 100 is present as an application specific integrated circuit, the four terminals on the interface end and the six terminals on the data processing end being pins of the integrated circuit. The connections between the individual components are strip conductors in the integrated circuit.

As stated above, second data transmission device 200 is designed to be identical to first transmission device 100.

Interface device 10 has four interface terminals, namely a first interface terminal 12, a second interface terminal 14, a third interface terminal 16 and a fourth interface terminal 18. Interface device 10 has a standardized interface with which vehicle diagnostic device 2 may be coupled to a corresponding interface of the vehicle, so that data or signals may be exchanged between vehicle diagnostic device 2 and the vehicle. The interface between vehicle diagnostic device 2 and the vehicle may have an arbitrary number of terminals. In particular, four, eight, sixteen or thirty-two terminals may be present. The exemplary use of four terminals, as shown in FIG. 1, serves to simplify the description of the present invention in comparison with a larger number of interface terminals.

First interface terminal 12 is coupled to first terminal 102 on the interface end of first data transmission device 100 as well as to first terminal 202 on the interface end of second data transmission device 200. Second interface terminal 14 is coupled to second terminal 104 on the interface end of first data transmission device 100 and to fourth terminal 208 on the interface end of second data transmission device 200. Third interface terminal 16 is connected to the third terminal on the interface end of first data transmission device 100 and to second terminal 204 on the interface end of second data transmission device 200. Fourth interface terminal 18 is coupled to fourth terminal 108 on the interface end of first data transmission device 100 and to third terminal 206 on the interface end of second data transmission device 200.

Data processing device 20 includes six communication terminals, namely a first communication terminal 22, a second communication terminal 24, a third communication terminal 26, a fourth communication terminal 28, a fifth communication terminal 30 and a sixth communication terminal 32. First communication terminal 22, second communication terminal 24 and third communication terminal 26 are coupled to first terminal 110 on the data processing end, second terminal 112 on the data processing end and fifth terminal 118 on the data processing end of first data transmission device 100. Fourth communication terminal 28, fifth communication terminal 30 and sixth communication terminal 32 are coupled to second terminal 112 on the data processing end, third terminal 214 on the data processing end and sixth terminal 220 on the data processing end of second data transmission device 200. Sixth communication terminal 32 and sixth terminal 220 on the data processing end of second data transmission device 200 are interconnected via an external diagnostic protocol driver circuit 40.

Reference shall be made again explicitly to the fact that the specific embodiment in FIG. 1 relates to a purely exemplary implementation. This example is intended only to illustrate the present invention but not to restrict it in particular with regard to the arrangement, number and coupling of the interface terminals of the interface device, the terminals on the interface end of the data transmission devices, the terminals on the data processing end of the data transmission devices, the communication terminals of the data processing device and the protocol driver circuits.

The terms "terminals on the interface end" and "terminals on the data processing end" do not relate to the geometric arrangement of the terminals. Instead these terms constitute only a differentiation between the terminals intended for coupling to the interface device and the terminals intended for coupling to the data processing device.

The function of vehicle diagnostic device 2 is explained below. In general, data processing device 20 initiates a desired diagnostic protocol through a corresponding signal to the corresponding diagnostic protocol driver circuit. The diagnostic protocol driver circuit thereby initiated then causes the data or signals relevant for the diagnostic protocol to be forwarded and optionally processed between the vehicle and data processing device 20 by first data transmission device 100 or by second data transmission device 200. Data processing device 20 then evaluates the received data or signals and determines whether and to what extent the tested component(s) of the vehicle are behaving in accordance with their specification. The result of this test may be stored by the data processing device or output via an output device, for example, a display (not shown). It is also possible for data processing device 20 to forward the results to another unit, such as a service computer, for example. This may take place by a hardwired or wireless method, the wireless method being preferred in the case of portable vehicle diagnostic devices in many cases.

In addition, data for programming of control units in the vehicle may also be conveyed to the vehicle via data processing device 20. Furthermore, it is possible to send analog signals to an analog-to-digital converter via data processing device 20 in order to enable, for example, a detailed diagnosis in the case of problems with establishing a connection or to activate a scan cycle.

Since five diagnostic protocol driver circuits 140, 142, 144, 146 and 40 are available in the present specific embodiment, data processing device 20 may carry out at least five different diagnostic protocols. As is apparent in FIG. 1, data processing device 20 may carry out a first diagnostic protocol, a second diagnostic protocol and a fourth diagnostic protocol via first diagnostic protocol driver circuit 140, second diagnostic protocol driver circuit 142 and fourth diagnostic protocol driver circuit 146 of first data transmission device 100.

In addition, data processing device 20 may carry out a third diagnostic protocol via third diagnostic protocol driver circuit 244 and a fifth diagnostic protocol via external diagnostic protocol driver circuit 40. Depending on the use and configuration of second diagnostic protocol driver circuits 124 and 242, data processing device 20 may carry out either the second diagnostic protocol via second data transmission device 200 or may query an additional diagnostic protocol via communication terminal 28. The reason for these two options is the different couplings between interface device 10 and the respective terminals on the interface end of first and second data transmission devices 100, 200. Due to switching matrix 130, it may be possible that second diagnostic protocol driver circuit 242 of second data transmission device 200 forwards the same data or signals as second diagnostic protocol driver circuit 142 of the first data transmission device. However, it is also possible that another diagnostic protocol is implemented through permutation of the input signals.

Different diagnostic protocols may also be implemented by different activation of switching matrix 130 and of switching matrix 230 in the two data transmission devices. It is possible that switching matrix 130 (and thus also switching matrix 230) is (are) capable of connecting each of their inputs to each of their outputs, i.e., enabling any switching combination. However, it is also possible that switching matrix 130 (and thus also switching matrix 230) enables a limited number of switching combinations, in particular a limited number of parallel switching combinations at the same time. Since two identical data transmission devices 100 and 200 are provided, each switching matrix 130 and 230 may be designed with limitations, whereby the combination of two switch matrices 130 and 230 supplies the total desired signal forwarding bandwidth. An inexpensive and less complex type of switching matrix, which is sufficient for the data flow in less complex applications, may be made available and which, in combination with another switching matrix, fulfills the switching capacity for complex applications.

In addition, reference is also made to the diagnostic protocol implemented by external diagnostic protocol driver circuit 40, which directly accesses the input signal of second interface terminal 14. The signal is not available at sixth terminal 120 on the data processing end of the first data transmission device. This illustrates that additional protocols that would not be possible with a single data transmission device or would be possible only with a certain use of switching matrix 130 are made possible through the different couplings between the terminals on the interface end of the transmission devices and of the interface device.

In general, it is apparent that the data or signal transmission for the execution of various diagnostic protocols may be divided between two data transmission devices 100, 200, whereby providing the second data transmission device not only allows a faster parallel operation of diagnostic protocols but also provides additional flexibility in the implementation of protocols.

What is claimed is:

1. A vehicle diagnostic device for determining a condition of at least one component of a motor vehicle, comprising:
   an interface device that is coupleable to a diagnostic interface of the motor vehicle,
   a first data transmission device that is coupled to the interface device, a second data transmission device that is coupled to the interface device, the first and second data transmission devices being identical circuits, and
   a data processing device coupled to the first and second data transmission devices, wherein the data processing device is configured to carry out a plurality of diagnostic protocols and additionally configured to carry out different diagnostic protocols via the first and second data transmission devices, wherein:
   the interface device has a plurality of interface terminals,
   the first data transmission device includes a plurality of terminals on an interface end, at least one first subset of which is coupled to the interface terminals,
   the second data transmission device includes a plurality of terminals on the interface end, at least one second subset of which is coupled to the interface terminals, and
   the coupling of the terminals on the interface end of the first data transmission device to the interface terminals of the interface device is different from the coupling of the terminals on the interface end of the second data transmission device to the interface terminals of the interface device.

2. The vehicle diagnostic device as recited in claim 1, wherein the first and the second data transmission devices are integrated circuits.

3. The vehicle diagnostic device as recited in claim 1, wherein the first and the second data transmission devices are application specific integrated circuits (ASICs).

4. The vehicle diagnostic device as recited in claim 1, wherein each of the first and second data transmission devices includes a plurality of diagnostic protocol driver circuits.

5. The vehicle diagnostic device as recited in claim 4, wherein:
   the data processing device is coupled to a first subgroup of the diagnostic protocol driver circuits of the first data transmission device,
   the data processing device is coupled to a second subgroup of the diagnostic protocol driver circuits of the second data transmission device, and the first subgroup is different from the second subgroup.

6. The vehicle diagnostic device as recited in claim 4, wherein:
   each of the first and second data transmission devices includes a plurality of terminals on an interface end, and
   at least some of the respective diagnostic protocol driver circuits are coupled to the terminals at the interface end via at least one switching matrix.

7. The vehicle diagnostic device as recited in claim 1, wherein at least one external diagnostic protocol driver circuit is coupled between the data processing device and at least one of the first and the second data transmission devices.

8. The vehicle diagnostic device as recited in claim 1, further comprising at least one additional data transmission device, wherein the at least one additional data transmission device is a circuit identical to the first and the second data transmission devices.

9. A method for operating a vehicle diagnostic device that includes an interface device that is coupleable to a diagnostic interface of the motor vehicle, a first data transmission device that is coupled to the interface device, a second data transmission device that is coupled to the interface device, the first and second data transmission devices being identical circuits, and a data processing device coupled to the first and second data transmission devices, wherein the data processing device is configured to carry out a plurality of diagnostic protocols and additionally configured to carry out different diagnostic protocols via the first and second data transmission devices, the method comprising:
   carrying out a first diagnostic protocol, a communication between the data processing device and the interface device taking place via the first data transmission device, and
   carrying out a second diagnostic protocol, a communication between the data processing device and the interface device taking place via the second data transmission device, wherein:
   the interface device has a plurality of interface terminals,
   the first data transmission device includes a plurality of terminals on an interface end, at least one first subset of which is coupled to the interface terminals,
   the second data transmission device includes a plurality of terminals on the interface end, at least one second subset of which is coupled to the interface terminals, and
   the coupling of the terminals on the interface end of the first data transmission device to the interface terminals of the interface device is different from the coupling of the terminals on the interface end of the second data transmission device to the interface terminals of the interface device.

\* \* \* \* \*